(12) United States Patent
Bork et al.

(10) Patent No.: US 8,434,634 B2
(45) Date of Patent: May 7, 2013

(54) RATCHETING GAUGE CAP

(75) Inventors: Kevin W. Bork, Germantown, WI (US);
Michael J. Holz, West Bend, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 461 days.

(21) Appl. No.: 12/779,874

(22) Filed: May 13, 2010

(65) Prior Publication Data

US 2011/0278293 A1 Nov. 17, 2011

(51) Int. Cl.
*B65D 51/16* (2006.01)
*G01F 23/50* (2006.01)
*B65D 53/00* (2006.01)
*G01F 23/30* (2006.01)

(52) U.S. Cl.
USPC ..... 220/212; 220/304; 220/203.02; 220/DIG. 33; 116/228; 73/309

(58) Field of Classification Search .................. 220/212, 220/367.1, DIG. 33, 203.09, 203.19, 203.28, 220/377; 73/320, 309; 116/228, 229
See application file for complete search history.

(56) References Cited

U.S. PATENT DOCUMENTS

| | | | |
|---|---|---|---|
| 1,366,214 A | 1/1921 | Ritz-Woller | |
| 1,371,395 A | 3/1921 | Rast | |
| 1,457,471 A | 6/1923 | Stivers | |
| 3,907,155 A | 9/1975 | Smith et al. | |
| 3,986,634 A | 10/1976 | Smith et al. | |
| 4,083,209 A | 4/1978 | Sloan, Jr. | |
| 4,107,961 A | 8/1978 | Evans | |
| 4,280,346 A | 7/1981 | Evans | |
| 4,549,668 A * | 10/1985 | Krauss et al. | 220/203.27 |
| 4,724,706 A | 2/1988 | Stiever | |
| 4,809,869 A | 3/1989 | Cosgrove et al. | |
| 4,830,213 A | 5/1989 | Sleder | |
| 4,991,436 A | 2/1991 | Roling | |
| 5,110,003 A | 5/1992 | MacWilliams | |
| 5,183,173 A | 2/1993 | Heckman | |

(Continued)

FOREIGN PATENT DOCUMENTS

DE 2206583 8/1973

OTHER PUBLICATIONS

Kelch 2.25" fuel gauge cap. On sale in the U.S. prior to May 13, 2009.

(Continued)

*Primary Examiner* — Robin Hylton
(74) *Attorney, Agent, or Firm* — Michael Best & Friedrich LLP

(57) ABSTRACT

A cap may include a threaded inner body and an outer cover. A ratchet mechanism may be operatively positioned between the inner body and the outer cover to directly transmit rotation from the outer cover to the inner body in the cap-unthreading direction and to transmit no more than a predetermined amount of torque from the outer cover to the inner body in the cap-threading direction. A gauge assembly may include a float, an indicator dial, and a pointer. The float is supportable at a level of fluid within the container, and the pointer is movable in response to movement of the float with the level of fluid in the container. The pointer cooperates with the indicator dial to indicate the level of fluid in the container. A translucent crystal may be positioned over the indicator dial and the pointer. The crystal may be fixed relative to the inner body.

20 Claims, 5 Drawing Sheets

U.S. PATENT DOCUMENTS

| | | |
|---|---|---|
| 6,325,233 B1 | 12/2001 | Harris |
| 6,739,472 B2 | 5/2004 | Newport |
| 6,745,914 B2 | 6/2004 | Hagano et al. |
| 6,763,966 B2 | 7/2004 | Harris |
| 6,814,251 B2 | 11/2004 | Hagano |
| 6,997,339 B2 | 2/2006 | Ueki |
| 7,025,222 B2 | 4/2006 | Hagano et al. |
| 7,344,042 B2 | 3/2008 | Hagano |
| D580,807 S | 11/2008 | Xi-Ren |
| 7,658,105 B2 * | 2/2010 | Holz ............................... 73/320 |
| 2005/0263525 A1 | 12/2005 | Yoshida et al. |
| 2007/0164031 A1 | 7/2007 | Holz |
| 2007/0170187 A1 | 7/2007 | Tharp et al. |

OTHER PUBLICATIONS

Kelch 2.25" ratchet cap. On sale in the U.S. prior to May 13, 2009.

* cited by examiner

RATCHETING GAUGE CAP

BACKGROUND

The present invention relates to liquid level-indicating caps for containers such as fuel tanks, etc.

SUMMARY

In one aspect, the invention may provide a ratcheting cap with a gauge assembly. The cap may generally include a threaded inner body configured to engage the threaded aperture of a container. An outer cover is configured to be rotated in a cap-threading direction, to install the cap on a container, and in a cap-unthreading direction, to remove the cap from the container. The outer cover is rotatable relative to the inner body. A ratchet mechanism is operatively positioned between the inner body and the outer cover. The ratchet mechanism is configured to directly transmit rotation from the outer cover to the inner body in the cap-unthreading direction and to transmit no more than a predetermined amount of torque from the outer cover to the inner body in the cap-threading direction.

The gauge assembly includes a float, an indicator dial, and a pointer. The float is supportable at a level of fluid within the container. The pointer is movable in response to movement of the float with the level of fluid in the container. The pointer cooperates with the indicator dial to indicate the level of fluid in the container. A translucent crystal is positioned over the indicator dial and the pointer. The crystal is fixed relative to the inner body.

In another aspect, the cap may generally include a threaded inner body, an outer cover defining a central aperture, a ratchet mechanism and a gauge assembly. In the gauge assembly, a translucent crystal covers the indicator dial and the pointer, and the crystal is positioned over the aperture in the outer cover to simulate a crown portion of the outer cover. The outer cover is rotatable relative to the crystal when a torque in excess of the predetermined amount is applied between the outer cover and the inner body in the cap-threading direction.

In yet another aspect, the cap may generally include a threaded inner body, an outer cover defining a central aperture, a ratchet mechanism and a gauge assembly. In the gauge assembly, a translucent crystal covers the indicator dial and the pointer, and the crystal is fixed to the indicator dial such that the outer cover is rotatable relative to the crystal when a torque in excess of the predetermined amount is applied between the outer cover and the inner body in the cap-threading direction.

Other independent aspects of the invention will become apparent by consideration of the detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
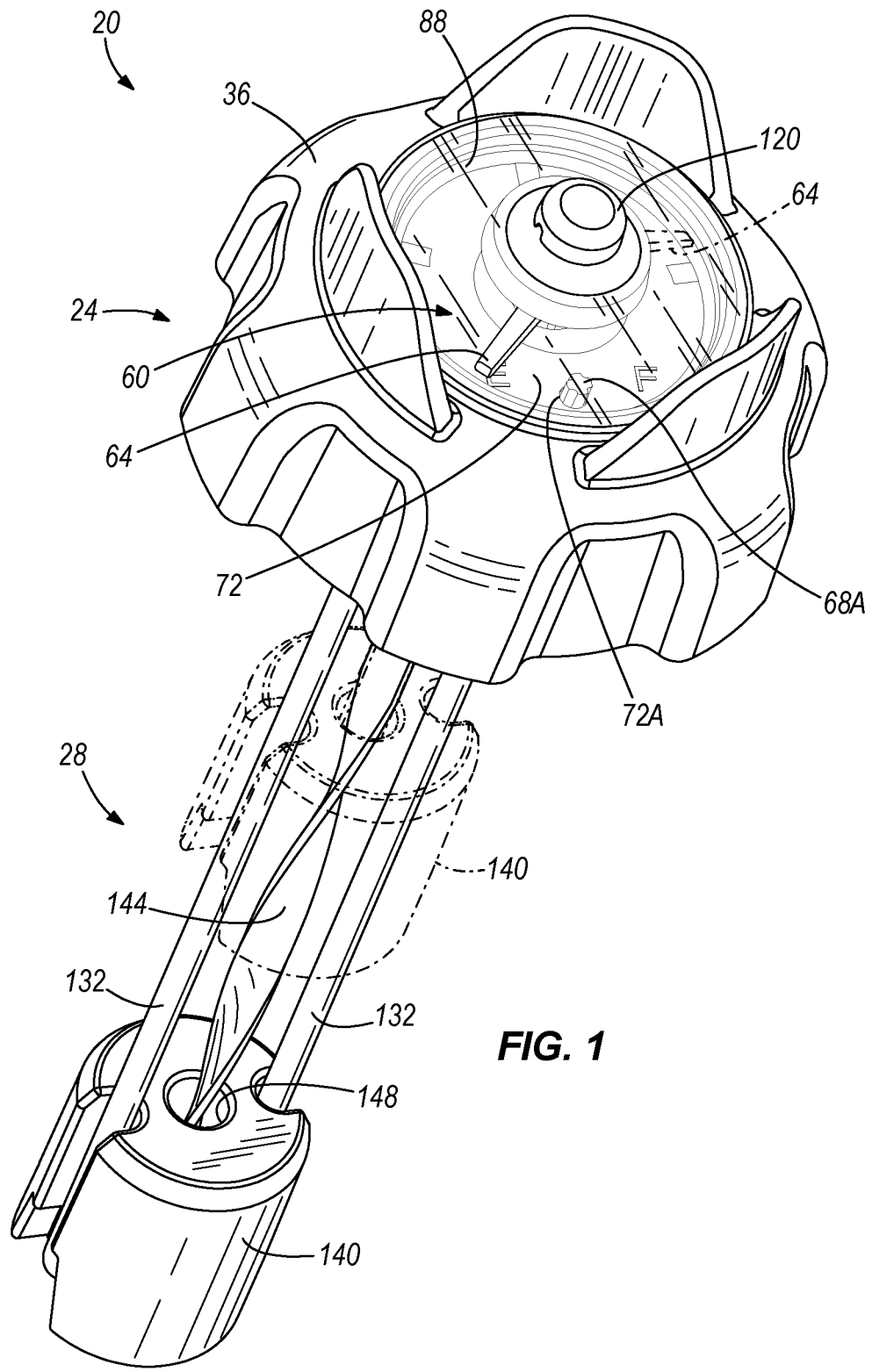
FIG. 1 is a perspective view of a ratcheting, level-indicating cap.
Figure 2:
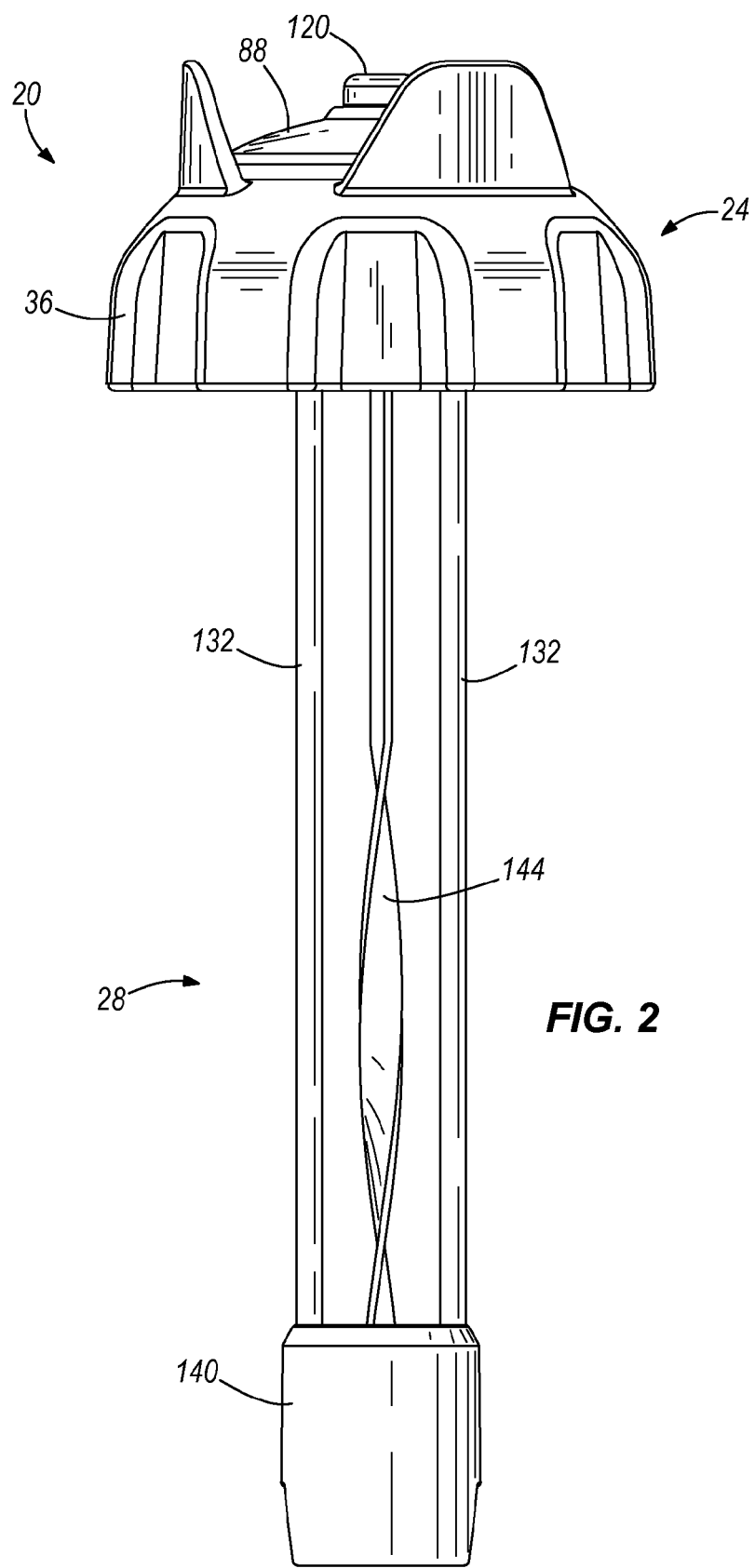
FIG. 2 is a front view of the cap of FIG. 1.
Figure 3:
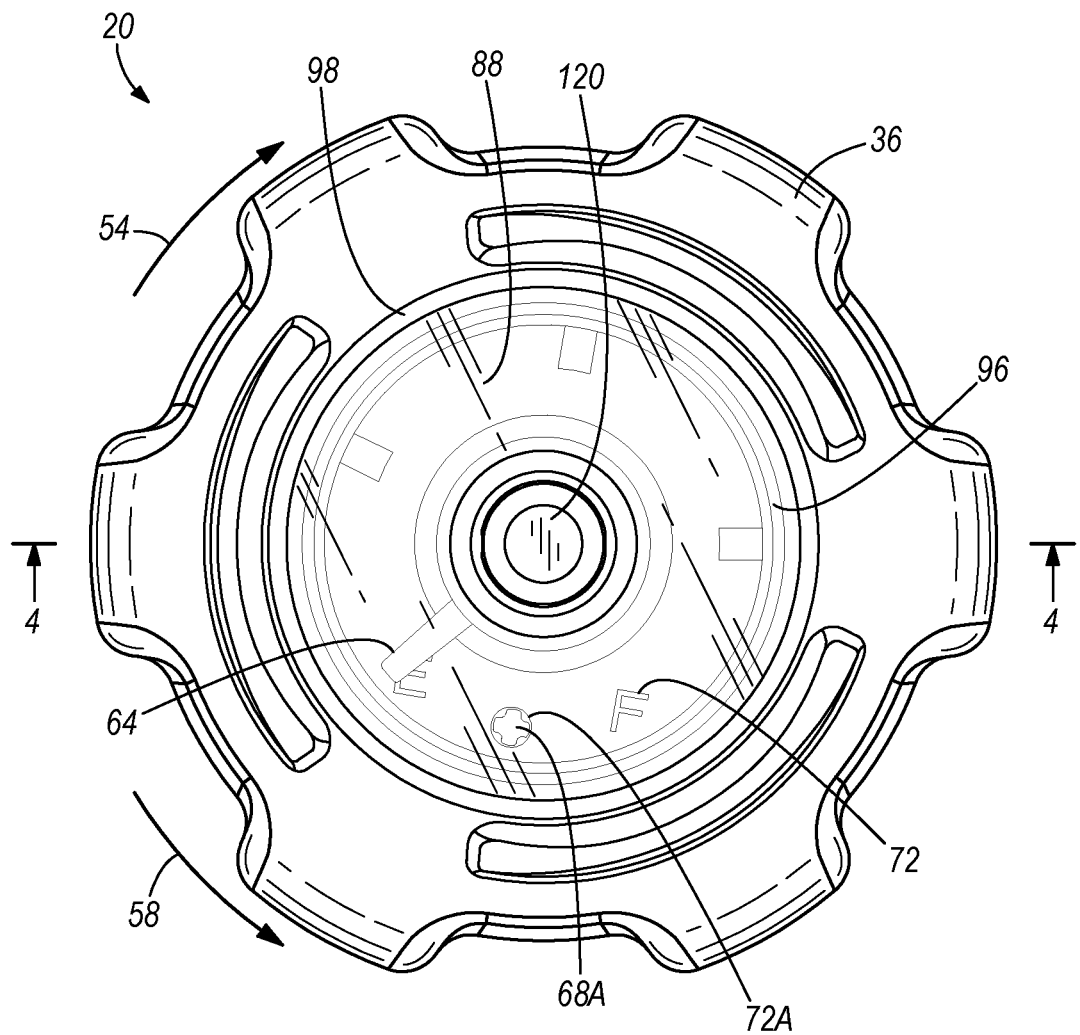
FIG. 3 is a top view of the cap of FIG. 1.
Figure 4:
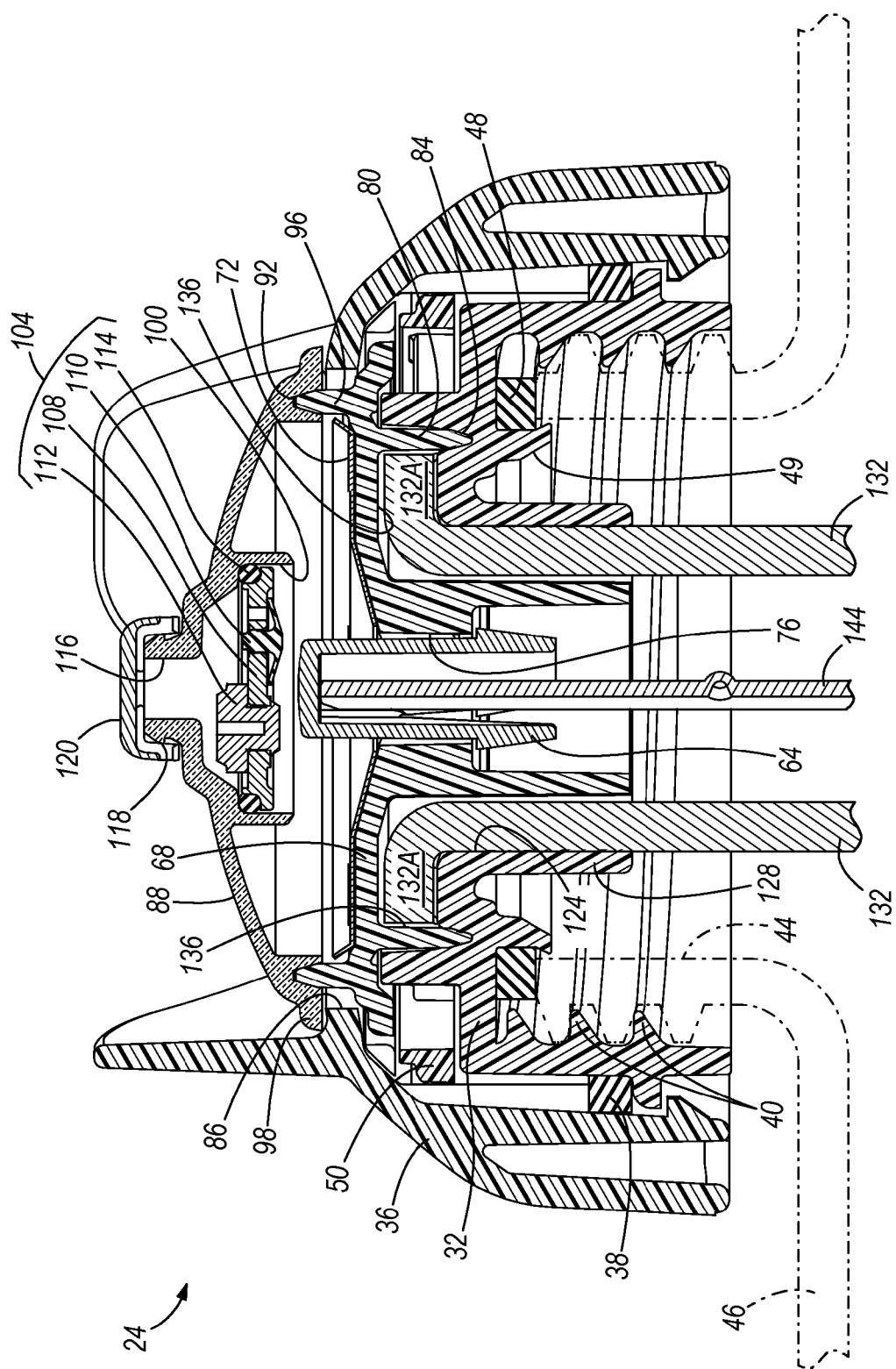
FIG. 4 is a cross-sectional view, taken along line 4-4 of FIG. 3.
Figure 5:
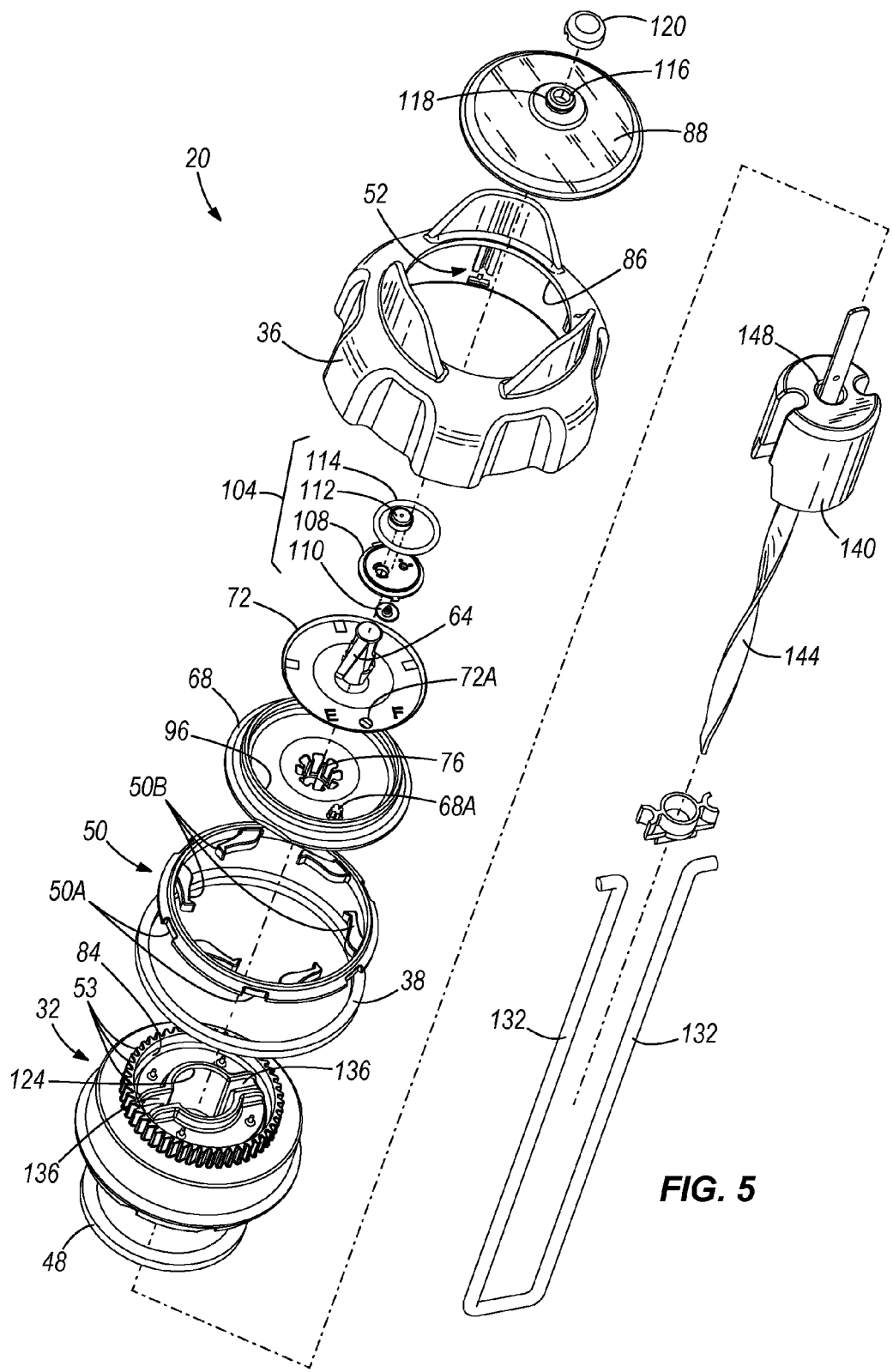
FIG. 5 is an exploded assembly view of the cap of FIG. 1.

A cap 20 for closing a container is illustrated in FIGS. 1-5. In some aspects, the cap 20 is a ratcheting cap and/or a fluid level-indicating cap. The cap 20 generally includes a closure portion 24 and gauge assembly including a level detection mechanism 28. The closure portion 24 includes a threaded inner body 32 and an outer body or cover 36. A dust seal 38 is provided between the threaded inner body 32 and the outer cover 36.

In the illustrated construction, the inner body 32 includes female threads 40, but alternate thread gender, size, and pitch are optional. The cap 20 is configured to be coupled to a threaded aperture 44 of a container 46 (shown in phantom in FIG. 4) to close the aperture 44 and thus close the container 46. In some constructions, the container 46 is a fuel tank for a vehicle or gasoline-powered implement, such as a lawn tractor, snow thrower, etc. However, the cap 20 is not limited to use in vehicles or gasoline-powered implements and may be configured to sense and indicate the level of virtually any liquid in any type of container while closing the aperture of said container. A seal member 48 is retained on a boss 49 on the interior of the threaded inner body 32, adjacent the end of the threads 40, and is configured to contact and seal against the aperture 44 of the container 46.

The outer cover 36 is coupled to the threaded inner body 32 through a torque-limiting ratcheting mechanism. In the illustrated construction, the ratcheting mechanism includes a one-way ratcheting pawl 50 that limits the amount of torque transferred from the outer cover 36 to the threaded inner body 32 in a cap-installation or cap-threading direction (in the direction of arrow 54 in FIG. 3). The pawl 50 is formed separately from the outer cover 36 and includes a first set of engagement features 50A that are non-rotatably coupled to the inside of the outer cover 36. In the illustrated construction, the first set of engagement features 50A include six exterior notches, and the notches engage six corresponding ribs 52 on the interior of the outer cover 36 to non-rotatably couple the pawl 50 to the outer cover 36.

A second set of engagement features 50B establish a connection with the inner threaded body 32 that is torque-limited in one direction (e.g., in the cap-installation or cap-threading direction). In the illustrated construction, the second set of engagement features 50B include six flexible toothed fingers that are engageable with a plurality of ratchet teeth 53 on the inner threaded body 32. The pawl 50 allows the outer cover 36 to rotate relative to the threaded inner body 32 when the torque exceeding a predetermined amount is applied in the cap-threading direction 54 (at which point deflection of the flexible fingers 50B occurs). Radially outward deflection of the flexible fingers 50B is initiated by providing the flexible fingers 50B and the ratchet teeth 53 on the inner threaded body 32 with complementary engagement faces that are inclined relative to the direction of the applied force, which is substantially tangential. In the illustrated construction, the pawl 50 provides a direct, non-torque-limited connection between the outer cover 36 and the threaded inner body 32 in a cap-removal or cap-unthreading direction (in the direction of arrow 58 in FIG. 3). The flexible fingers 50B and the ratchet teeth 53 on the inner threaded body 32 are each provided with additional complementary engagement faces that are generally flat and oriented substantially perpendicular to the tangential direction of force transmission.

Although the cap 20 is illustrated as including the separately-formed pawl 50 between the inner threaded body 32 and the outer cover 36, a separately-formed member need not be provided in some constructions. For example, the features of the pawl 50 described above and illustrated in the drawings may be incorporated into the interior of the outer cover 36, eliminating the need to join the pawl 50 with the outer cover 36 during final assembly. In such a construction, the features and operation of the pawl 50 are still present, including the flexible fingers 50B and the ratchet teeth 53 which engage in the same way to define a ratchet mechanism operatively positioned between and coupling the inner threaded body 32 and the outer cover 36. It should also be noted that the pawl 50, whether integrated or separately-formed, may be operatively associated (i.e., configured to be rotatable) with the inner threaded body 32 rather than the outer cover 36, and the outer cover 36 may then include ratchet teeth similar to the ratchet teeth 53.

A level-indicating mechanism 60 of the gauge assembly is positioned substantially inside the closure portion 24 of the cap 20 and is operatively coupled to the level detection mechanism 28, as described below. In the illustrated construction, the level-indicating mechanism 60 includes a pointer 64, a gauge body 68, and an indicator dial 72.

The gauge body 68 is configured as a dial platform on which the indicator dial 72 is positioned. A projection 68A of the gauge body 68 extends through an aperture 72A in the indicator dial 72 to properly orient the indicator dial 72 relative to the gauge body 68 and relative to the level detection mechanism 28. The indicator dial 72 is a thin plate including indicia (e.g., printed, embossed, etched, etc.) that corresponds to various fluid levels that may be detected by the level detection mechanism 28. The pointer 64 is positioned in a central aperture 76 in the gauge body 68 and is rotatable therein in response to the level detection mechanism 28. Although the illustrated cap 20 includes a separate gauge body 68 and indicator dial 72, in other constructions, the gauge body 68 may be provided with indicia directly thereon.

In the illustrated construction, the gauge body 68 is separately manufactured from and subsequently fixed to the threaded inner body 32. In the illustrated construction, the gauge body 68 and the threaded inner body 32 include concentric mating features that are non-rotatably bonded together. The illustrated mating features include a circular projecting wall 80 of the gauge body 68 and a circular groove 84 of the threaded inner body 32. In other constructions, the projecting wall 80 and the groove 84 may be reversed or alternately configured.

Bonding of the gauge body 68 and the threaded inner body 32 may be accomplished by spin welding to join the components together by localized friction-induced melting. However, other means of bonding the gauge body 68 and the threaded inner body 32 may be utilized, including but not limited to ultrasonic welding, glue, epoxy, other adhesive, mechanical fasteners, such as screws, pins, clips, rivets, etc. Furthermore, the gauge body 68 and the inner threaded body 32 may be jointly manufactured as a single piece or co-molded together.

A large central aperture 86 is provided at the upper portion of the outer cover 36. Thus, the outer cover 36 is substantially crown-less. A translucent lens or "crystal" 88 covers the gauge body 68 and the indicator dial 72 while allowing the level-indicating mechanism 60 to be viewed.

Similar to the interface between the gauge body 68 and the inner threaded member 32, the crystal 88 includes a circular groove 92 into which a circular projecting wall 96 of the gauge body 68 fits. The crystal 88 is non-rotatably bonded to the gauge body 68. As with the interface between the gauge body 68 and the inner threaded member 32, the groove 92 and the projecting wall 96 can be reversed or provided with alternate shapes. Also, the crystal 88 and gauge body 68 may be bonded by spin welding or other processes described above, among others.

A perimeter portion 98 of the crystal 88 extends radially outwardly over the edge of the aperture 86 around the entire perimeter of the aperture 86. In the illustrated construction, the perimeter portion 98 of the crystal 88 is spaced a very small distance from the outer cover 36. In alternate constructions, the perimeter portion 98 of the crystal 88 may contact the outer cover 36 but is not attached or bonded to the outer cover 36. In the illustrated construction, the outer cover 36 may rotate relative to the crystal 88 when torque exceeding the predetermined amount is applied to the outer cover 36 in the cap-threading direction 54.

The crystal 88 includes an interior recess 100 in which a vent assembly 104 is positioned. In the illustrated construction, the vent assembly 104 includes a valve plate 108 and two valve members 110, 112. A perimeter edge of the valve plate 108 is sealed against a shoulder of the recess 100 with a seal member 114 (e.g., an O-ring). Both valve members 110, 112 are normally closed. The first valve member 110 is configured to allow outside atmospheric air into the interior of the cap 20 (and into the container 46) when the pressure on the exterior side of the first valve member 110 exceeds the pressure on the interior side of the first valve member 110 by a predetermined amount. This allows "make-up" air to enter the container 46 as the liquid level goes down.

The second valve member 112 is configured to allow gases from the interior of the cap 20 (and the container 46) to escape to the outside when the pressure on the interior side of the second valve member 112 exceeds the pressure on the exterior side of the second valve member 112 by a predetermined amount. This inhibits excessive pressure from being maintained inside the container 46. The absolute value of the predetermined pressure differentials for opening the first and second valve members 110, 112 may be the same or different.

The crystal 88 includes a vent aperture 116 that is in communication with the recess 100 and the vent assembly 104. In the illustrated construction, the vent aperture 116 is centrally located in the crystal 88, and the vent aperture 116 is provided with a barbed exterior wall 118 to which a snap-on cover 120 is attached. In alternate constructions, the cover 120 is coupled to the crystal 88 by other means. The cover 120 inhibits rain water, debris, etc. from entering into the interior of the cap 20. This inhibits deterioration of or interference with the operation of the valves 110, 112 or the pointer 64. The cover 120 may also inhibit visual degradation of the indicator dial 72 and/or of the indicia thereon.

The inner threaded member 32 includes a central aperture 124 bounded by an axially-extending guide wall 128. Two rod-like guide legs 132 of the level detection mechanism 28 extend through the inside of the central aperture 124. An intrinsic spring force may keep the guide legs 132 pressed radially outwardly into contact with the guide wall 128. The ends 132A of the guide legs 132 are bent at substantially right angles to fit into pockets 136 formed by the inner threaded member 32 and the gauge body 68. As such, inadvertent movement or release of the guide legs 132 from the closure portion 24 is impeded.

A float 140 of the level detection mechanism 28 is slidably received on the guide legs 132. The float 140 may be configured for a particular liquid or general type of liquid so that the density of the float 140 is low enough to ensure buoyancy in the liquid and thus, accurate representation of the level of liquid within the container 46. The float 140 slides relatively freely on the guide legs 132. An output rod 144 of the level detection mechanism 28 is engaged with a central aperture 148 in the float 140. The output rod 144 is twisted so that axial movement of the float 140 along the guide legs 132 causes rotation of the output rod 144. The pointer 64 is coupled to the end of the output rod 144, and the twist in the output rod 144 is calibrated such that the pointer 64 always points to indicia on the indicator dial 72 that corresponds to the position of the float 140 and, thus, to the relative liquid level within the container 46.

Various features and advantages of the invention are set forth in the following claims.

What is claimed is:

1. A cap for a container, the container including a threaded aperture, the cap comprising:
   a threaded inner body configured to engage the threaded aperture;
   an outer body configured to be rotated in a cap-threading direction, to install the cap on a container, and in a cap-unthreading direction, to remove the cap from the container, the outer body being rotatable relative to the inner body;
   a ratchet mechanism operatively positioned between the inner body and the outer body, the ratchet mechanism directly transmitting rotation from the outer body to the inner body in the cap-unthreading direction and transmitting no more than a predetermined amount of torque from the outer body to the inner body in the cap-threading direction;
   a gauge assembly positioned on the inner body, the gauge assembly including
      a float supportable at a level of fluid within the container,
      an indicator dial, and
      a pointer movable in response to movement of the float with the level of fluid in the container, the pointer cooperating with the indicator dial to indicate the level of fluid in the container; and
   a translucent crystal positioned over the indicator dial and the pointer, the crystal being fixed relative to the inner body.

2. The cap of claim 1, further comprising a vent valve assembly at least partially positioned within a recess of the crystal.

3. The cap of claim 2, wherein the vent valve assembly includes a two-way pressure relief valve.

4. The cap of claim 1, wherein both the crystal and the inner body are directly bonded to the indicator dial.

5. The cap of claim 4, wherein a circumferential projection-and-groove interface is defined between the indicator dial and each of the crystal and the inner body.

6. The cap of claim 5, wherein the indicator dial includes a first circumferential wall projecting in an axial direction from a first side of the indicator dial and configured to be received by a groove in the crystal, and a second circumferential wall projecting in a direction substantially opposite the first circumferential wall, the second circumferential wall being configured to be received by a groove in the inner body.

7. The cap of claim 4, wherein he indicator dial is spin welded to each of the crystal and the inner body.

8. The cap of claim 4, wherein the indicator dial includes a dial platform body and an indicator sheet positioned on the dial platform body, the indicator sheet having indicia thereon corresponding to various fluid levels, the pointer being movable relative to the indicator sheet to visibly indicate a fluid level sensed by the float.

9. The cap of claim 1, wherein the gauge assembly further includes a float guide having two legs, each leg being received in a recess of the inner body.

10. The cap of claim 1, wherein the outer body defines an aperture having an edge and a perimeter, and wherein the crystal defines a perimeter portion extending over the edge of the aperture around the entire perimeter of the aperture.

11. A cap for a co airier, the container including a threaded aperture, the cap comprising:
   a threaded inner body configured to engage the threaded aperture;
   an outer body configured to be rotated in a cap-threading direction, to install the cap on a container, and in a cap-unthreading direction, to remove the cap from the container, the outer body being rotatable relative to the inner body, the outer body defining a central aperture;
   a ratchet mechanism operatively positioned between the inner body and the outer body, the ratchet mechanism directly transmitting rotation from the outer body to the inner body in the cap-unthreading direction and transmitting no more than a predetermined amount of torque from the outer body to the inner body in the cap-threading direction;
   a gauge assembly supported by the inner body the gauge assembly including
      a float,
      an indicator dial, and
      a pointer movable in response to movement of the float; and
   a translucent crystal bodying the indicator dial and the pointer, the crystal being fixed relative to the inner body, and positioned over the aperture in the outer body to simulate a crown portion of the outer body, the outer body being rotatable relative to the crystal and the gauge assembly when a torque in excess of the predetermined amount is applied between the outer body and the inner body in the cap-threading direction.

12. The cap of claim 11, further comprising a vent valve assembly at least partially positioned within a recess of the crystal.

13. The cap of claim 11, wherein the crystal is fixed relative to the inner body.

14. The cap of claim 13, wherein both the crystal and the inner body are directly bonded to the indicator dial.

15. The cap of claim 14, wherein a circumferential projection-and-groove interface is defined between the indicator dial and each of the crystal and the inner body.

16. The cap of claim 15, wherein the indicator dial includes a first circumferential wall projecting in an axial direction from a first side of the indicator dial and configured to be received by a groove in the crystal, and a second circumferential wall projecting in a direction substantially opposite the first circumferential wall, the second circumferential wall being configured to be received by a groove in the inner body.

17. The cap of claim 14, wherein the indicator dial is spin welded to each of the crystal and the inner body.

18. The cap of claim 14, wherein the indicator dial includes a dial platform body and an indicator sheet positioned on the dial platform body, the indicator sheet having indicia thereon corresponding to various fluid levels, the pointer being movable relative to the indicator sheet to visibly indicate a fluid level sensed by the float.

19. The cap of claim 11, wherein the crystal defines a perimeter portion that extends over an edge of the aperture in the outer body around an entire perimeter of the aperture.

20. A cap for a container, the container including a threaded aperture, the cap comprising:

a threaded inner body configured to engage the threaded aperture;

an outer body configured to be rotated in a cap-threading direction, to install the cap on a container, and in a cap-unthreading direction, to remove the cap from a container, the outer body being rotatable relative to the inner body, the outer body defining a central aperture;

a ratchet mechanism operatively positioned between the inner body and the outer body, the ratchet mechanism directly transmitting rotation from the outer body to the inner body in the cap-unthreading direction and transmitting no more than a predetermined amount of torque from the outer body to the inner body in the cap-threading direction;

a gauge assembly supported by the inner body, the gauge assembly including
a float,
an indicator dial fixed to the inner body, and
a pointer movable in response to movement of the float; and a translucent crystal bodying the indicator dial and the pointer and fixed to the indicator dial such that the outer body is rotatable relative to the crystal and the gauge assembly when a torque in excess of the predetermined amount is applied between the outer body and the inner body in the cap-threading direction.

* * * * *

UNITED STATES PATENT AND TRADEMARK OFFICE
CERTIFICATE OF CORRECTION

PATENT NO.         : 8,434,634 B2                                    Page 1 of 1
APPLICATION NO.    : 12/779874
DATED              : May 7, 2013
INVENTOR(S)        : Kevin W. Bork and Michael J. Holz It is certified that error appears in the above-identified patent and that said Letters Patent is hereby corrected as shown below:

In the Claims:

Column 6, Line 8 of Claim 11: Replace the words "co airier" with the word --container--

Column 6, Line 24 of Claim 11: add a --,-- between the words "body" and "the"

Column 6, Line 30 of Claim 11: Replace the word "bodying" with the word --covering--

Column 7, Line 21 of Claim 20: Replace the word "bodying" with the word --covering--

Signed and Sealed this
Sixteenth Day of July, 2013

Teresa Stanek Rea
*Acting Director of the United States Patent and Trademark Office*